(12) United States Patent
Hoffmann et al.

(10) Patent No.: US 7,392,198 B2
(45) Date of Patent: Jun. 24, 2008

(54) METHOD FOR TRACKING POSTAL ITEMS

(75) Inventors: Klaus Hoffmann, Constance (DE); Joachim Lindner, Constance (DE)

(73) Assignee: Siemens Aktiengesellschaft, Munich (DE)

( * ) Notice: Subject to any disclaimer, the term of this patent is extended or adjusted under 35 U.S.C. 154(b) by 508 days.

(21) Appl. No.: 10/203,091

(22) PCT Filed: Dec. 22, 2000

(86) PCT No.: PCT/DE00/04644

§ 371 (c)(1),
(2), (4) Date: Aug. 6, 2002

(87) PCT Pub. No.: WO01/59697

PCT Pub. Date: Aug. 16, 2001

(65) Prior Publication Data

US 2003/0014375 A1 Jan. 16, 2003

(30) Foreign Application Priority Data

Feb. 11, 2000 (DE) .................. 100 06 242

(51) Int. Cl.
G06Q 10/00 (2006.01)
G06F 7/00 (2006.01)

(52) U.S. Cl. ............................ 705/1; 700/229
(58) Field of Classification Search ............ 705/1, 705/5, 400–411; 700/229, 227, 226, 225
See application file for complete search history.

(56) References Cited

U.S. PATENT DOCUMENTS

| | | | | | |
|---|---|---|---|---|---|
| 3,757,037 A | * | 9/1973 | Bialek | ................ | 348/107 |
| 4,300,040 A | * | 11/1981 | Gould et al. | ................ | 235/381 |
| 4,338,644 A | * | 7/1982 | Staar | ................ | 360/132 |
| 5,038,283 A | * | 8/1991 | Caveney | ................ | 705/28 |
| 5,347,274 A | * | 9/1994 | Hassett | ................ | 340/988 |
| 5,455,409 A | | 10/1995 | Smith et al. | | |
| 5,712,789 A | * | 1/1998 | Radican | ................ | 700/226 |
| 5,869,819 A | * | 2/1999 | Knowles et al. | ................ | 235/375 |
| 6,547,137 B1 | * | 4/2003 | Begelfer et al. | ................ | 235/385 |
| 6,817,517 B2 | * | 11/2004 | Gunther | ................ | 235/375 |
| 2002/0123911 A1 | * | 9/2002 | Bjerre et al. | ................ | 705/5 |

FOREIGN PATENT DOCUMENTS

| | | |
|---|---|---|
| EP | 0 748 083 A1 | 12/1996 |
| WO | WO 96/13015 | 5/1996 |
| WO | WO 99/38136 | 7/1999 |

* cited by examiner

Primary Examiner—Igor N Borissov

(57) ABSTRACT

In a method for tracking postal items, the shipping details of each postal item are stored in a data base that can be interrogated and is updated during shipping. A data record which can be changed and completed is created in each original distribution center and for each postal item that is posted in the center. The data record contains a reference number and data that characterize the postal item and the shipping details. Each posted postal item is provided with an identification key in the original distribution center. The key uniquely characterizes the postal item. The postal items are transported to the destination distribution center, optionally via additional distribution centers. The reference numbers and the original distribution centers are subsequently detected in said succeeding distribution centers and the relevant shipping data including the reference numbers is electronically transmitted to the original distribution centers for completing the data records.

9 Claims, 2 Drawing Sheets

METHOD FOR TRACKING POSTAL ITEMS

BACKGROUND OF THE INVENTION

The invention relates to a method for tracking postal items, in which the shipping sequence of each postal item is stored in a data record that can be interrogated and is updated during shipping.

In order to ensure that the shipping of the postal items, such as letters, packages and the like, is carried out uniformly at high quality, it is necessary to determine the times at which a postal item is located where during the shipping sequence. In the case of valuable postal items, the customers (senders or recipients) also wish to have current information frequently as to when the postal item has reached the respective intermediate stations.

According to the prior art, two variants are known. In the first variant, the data records are collected and updated centrally. This requires expensive "high end" computers with a high data throughput. If the quantities of data are very high, then such a system can only be implemented technically in a very complicated manner.

In the second variant, the data records that can be interrogated are dispatched electronically in parallel with the stream of postal items and are stored, changed and supplemented in computers in the respective distribution centers. In this case, finding the information can take a very long time, since a search has to be made through the entire network.

SUMMARY OF THE INVENTION

The invention disclosed herein is therefore based on the object of tracking the postal items in the shipping process while avoiding expensive "high end" computers and without considerable effort on searching.

According to the invention, each postal item posted is provided in the original distribution center with an identification key which identifies it uniquely. In addition, a data record which can be changed and supplemented is created in the original distribution center for each postal item posted, said data record containing a reference number and data that characterizes the postal item and the shipping sequence. This data record is stored, at least for the duration of the shipping sequence. The postal items are then transported in accordance with the determined destination addresses to the destination distribution centers, possibly via one or more further distribution centers.

In each distribution center to which the respective postal item has been transported, the reference number and the original distribution center are then determined. Then, in each case the respective current data that characterizes the shipping sequence, together with the corresponding reference number, are transmitted electronically to the original distribution centers in order to supplement and/or change the data record associated with the respective reference number.

This therefore results in a decentralized solution without any necessary "high end" computers for high data rates. The information about the shipping sequence of the postal items is always available at a known point, the respective original distribution center, that is to say a high speed is achieved when searching for the data to track the postal item. The data records are completed during their run time so that on the electronic network there is always only a relatively small volume of data as a result of the shipping of slices of information.

It is advantageous if the identification key contains the reference number. This then makes it possible to determine the reference number of the respective postal item in the succeeding distribution centers by reading the identification key. Furthermore, it is advantageous if the identification key contains an identifier relating to the original distribution center, so that this can be determined simply in the succeeding distribution centers. This identifier can be implemented by means of agreed value ranges of the reference numbers.

In another advantageous refinement, data from the distribution centers, additionally determined there and characterizing the postal items, is transmitted electronically under the associated reference number to the respective original distribution center. This is advantageous, for example, if effective weighing of the postal items is not possible in the original distribution center but appropriate weighing devices are present in one of the succeeding distribution centers.

In a further advantageous refinement, prior electronic information about postal items to be expected is transmitted to the respective succeeding distribution centers to which the postal items are distributed, said prior information containing the reference numbers and the identification keys of the postal items to be expected, and advantageously also the data that characterizes the postal items. This makes it possible to provide the appropriate capacities in the succeeding distribution centers.

In order to make it easier to read the identification keys of the postal items when they are shipped across national boundaries in which the identification keys often lose their validity, it is advantageous to apply the identification key in encoded and unencoded form. An attempt will then be made first to read the encoded identification key automatically. If this is not possible, the unencoded identification key will be read.

It is also advantageous, when the validity limits of the identification keys are exceeded, to provide the postal items with new valid identification keys, for example by sticking them over the invalid identification keys.

If the identification keys are not legible, for example because they are invalid, or if the identification keys do not contain any reference numbers and if prior electronic information with the data that characterizes the postal items to be expected has been sent to the succeeding distribution centers, the reference numbers of the postal items can advantageously be determined by detecting the characteristics of the postal items and searching through the prior electronic information with the reference numbers in accordance with the detected characteristic data.

If no prior information was transmitted, then the reference number can be searched for in the data records of the original distribution center by using the determined postal item characteristics. In this case, the original distribution center can be determined via the sender's address.

It is also advantageous, in the case of Collico® postal items being shipped, also to include the reference numbers of the adjacent postal items with the identification key of the last postal item in the Collico® in the data record of each postal item in the Collico®. This avoids variable lengths in the data records.

In a further advantageous refinement, a radio frequency identification mark for identification is applied to the postal item.

BRIEF DESCRIPTION OF THE DRAWINGS

The invention will be illustrated below in an exemplary embodiment and using the drawing, in which.

DESCRIPTION OF PREFERRED EMBODIMENTS

Figure 1:
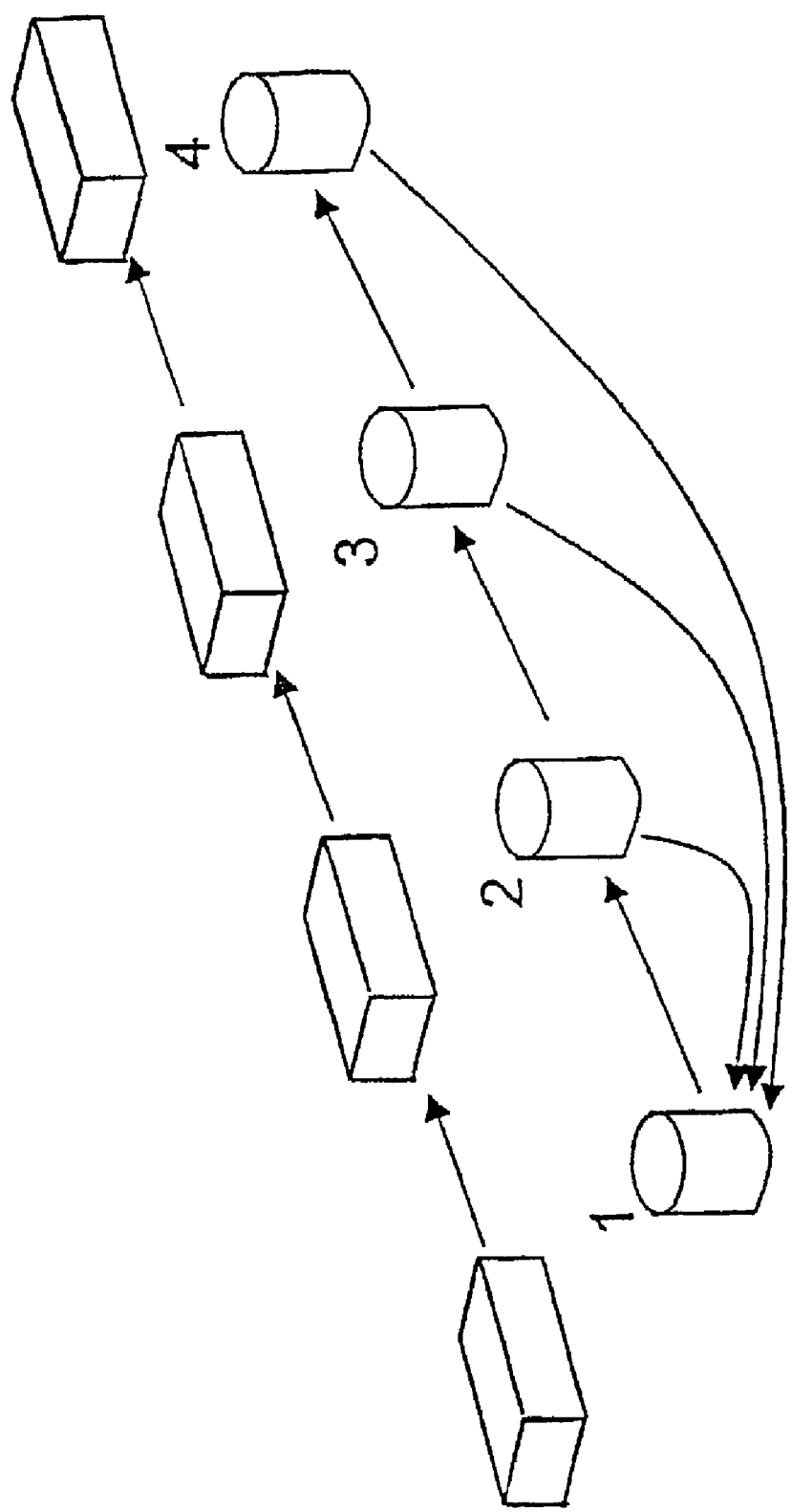
FIG. 1 shows a schematic representation of the postal item and information flow in the shipping process

As FIG. 1 illustrates, a package is transported as a postal item S from the original distribution center, at which it is posted, via two further distribution centers to the destination distribution center, from where it reaches the recipient.

In each distribution center there is, decentrally, a computer in which data relating to the shipping sequence and about the postal item characteristics for the postal items posted there is stored as a data record.

As illustrated schematically, information stored in the computers 1-3 of the individual distribution centers and relating to the postal items to be transported onwards is transmitted electronically to the computer of the respective distribution center receiving the postal items as prior information (indicated by the forward-directed arrow). The data records created in the computer 1 of the original distribution center contain, for each postal item posted there, a global part comprising, for example, the following information:

reference number
original distribution center
sender's address
recipient address
sender's e-mail address
dimensions, volume, weight
number of respective Collico® postal items with breakdown
statement of value
routing information
reference times and slices of information to be appended can be:

identification key as ID/barcode (with identification of the original distribution center)
forwarding distribution center
destination distribution center
acceptance of postal item by recipient
in each case associated date and time information Of course, the data records can also contain other or further information, such as data describing the transport sequence in more detail (when the postal item was in which transport means).

The prior information contains at least the identification keys and the reference numbers of the postal items to be expected.

In this example, recipient address and dimensions/weight are likewise a constituent part of the prior information.

The information contained in the individual distribution centers and relating to the shipping sequence is reported back to the original distribution center and completes and updates the data records in the computer 1 in relation to the respective postal items received (indicated by the arrows directed backwards).

The shipping processes can in this case also lead beyond the national boundaries. For example, a package from country A with the original distribution center can be transported via a further distribution center in this country, two distribution centers in country B and a distribution center in country C to the destination distribution center in the latter country.

In country A, a country-specific identification key (barcode) is applied, which is tracked appropriately. A data record with a reference number is created in the original distribution center, and the country-specific identification key is appended. Prepared prior information with the reference number is transmitted cyclically to the succeeding distribution centers. In this case, the last distribution center in the respective country sends the prior information to the first distribution center in the following country.

From country to country, it is necessary to solve the problem that the following country cannot read the identification key from the preceding land under certain circumstances. If this is the case, an additional identification key, which is understood in country B (new valid identification key) has to be applied in country A, or in country B the scanner function has to be adapted (enlargement of the range of validity) or, using the information available in country B (for example destination/sender's address, date, barcode image . . . ), an attempt is made to find the associated data record in country A. The aim of all these efforts is for the information from country B to be capable of allocation to the data record with the reference number in country A.

From country B, the current shipping information with the respective reference number from the prior information obtained is sent back to the original distribution center in country A. Additional information which may be determined, for example about the weight, which cannot be determined in country A because of a lack of balances, completes the global data record. In country B, the assignment of the country-specific identification key to the reference number is stored for the lifetime of the reference number in order to permit postal item tracking started in country B. Prepared prior information is also sent cyclically from country B to the relevant countries. In a similar way, country C passes on its information to country A.

The country-specific postal item tracking can also be sent later or only interrogated when required.

Figure 2:
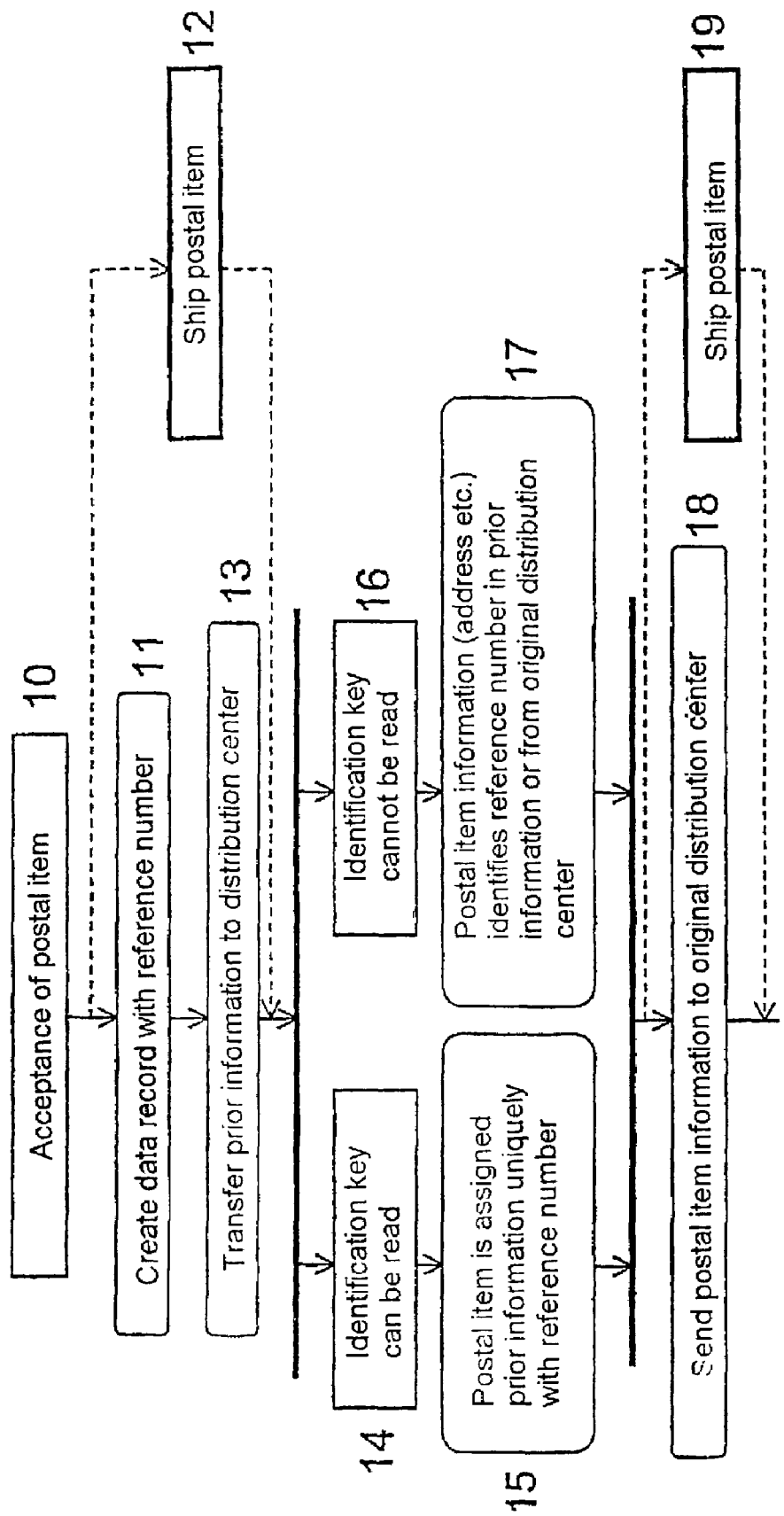
FIG. 2 shows a schematic representation of the method sequence

According to the method sequence illustrated in FIG. 2, first of all the posted item of mail is processed for the first time 10 in the original distribution center. In the process, it is separated, the surface of the postal item is scanned, the recipient address is at least partly read, so that the postal item can be sorted and shipped in the direction of the destination, and an identification key is applied to the surface of the postal item, containing a reference number. This facilitates the subsequent determination of the reference number, but is not absolutely necessary. Then, for each postal item, a data record with the content already outlined is created 11 with the reference number, and the postal item is shipped to the next distribution center on the route to the recipient.

Furthermore, prior information about the postal items to be expected is transmitted to this distribution center, with information about the reference number, the identification key, the recipient address and postal item characteristics, such as dimensions, weight.

At the respective distribution center receiving the shipped postal items, an attempt is then made to read the identification key. This is carried out, for example, with a barcode reader. If the identification key can be read 14, then the postal item is assigned uniquely 15 to the prior information with the reference number, and the current data characterizing the shipping sequence is transmitted electronically 18 to the original distribution center, and, following appropriate sorting operations, the postal item is shipped to the next distribution center 19. If it was not possible to read the identification key 16, neither an encoded nor an unencoded identification key, then the assignment of a reference number to the postal item is carried out by searching for detected characteristics (for example addresses) in the prior information with reference numbers 17.

The identification keys can be printed on and/or applied to the postal item as encoded radio frequency identification marks, which are then read with reading techniques known per se.

Collico® postal items, that is to say postal items which are transported together in a Collico®, are registered at the original distribution center and identified as such in the data record. For this purpose, the data record of the first postal item in the Collico® contains the reference number of the second postal item, the data record of the second postal item contains the reference numbers of the first and of the third postal items, the data record of the third postal item contains the reference numbers of the second and of the fourth postal items, and so on. The data record of the last postal item contains an identification key as the "last postal item". Each postal item provides information about adjacent postal items in the Collico®, in order that all postal items in the Collico® are also identifiable. In this way, variable lengths of the data records for a Collico® are therefore avoided.

The explanations in this exemplary embodiment do not signify any restriction of the invention. For example, it is of course possible to carry out the method even without the transmission of prior information. Then, if the identification key cannot be read, the reference number has to be determined by searching through the data records of the original distribution center for detected postal item characteristics, the original distribution center being determined by using the sender's address.

The invention claimed is:

1. A method for tracking postal items during distribution processes, in which a shipping sequence of each postal item is stored in a data record configured to be interrogated, comprising:
   receiving a postal item at one of a plurality of distribution centers for shipment to a destination distribution center, said one of a plurality of distribution centers being an original distribution center for said postal item, wherein each distribution center comprises a computer configured to store data records associated with postal items posted at the respective distribution center;
   determining at the original distribution center a destination address of the postal item;
   providing the postal item at the original distribution center with an identification key which identifies the postal item uniquely;
   creating a data record configured to be changed and supplemented for each postal item, said data record containing a reference number and data that characterizes the postal item and a shipping sequence, at least for the duration of the shipping sequence and said data record being maintained at the postal item's original distribution center;
   transporting the postal item in accordance with the determined destination address from the original distribution center towards the destination distribution center;
   in advance of arrival of the postal item at a distribution center, said distribution center being one of a further distribution center and the destination distribution center, forwarding information about the transported postal item as advance information to said distribution center, wherein the advance information includes data that characterizes each postal item to be forwarded to said distribution center;
   in each distribution center to which the postal item has been transported, subjecting the postal item to a process for obtaining the identification key to determine the reference number of the postal item;
   wherein, if obtaining the identification key is successful, the obtained identification key is used to determine the postal item's reference number, and wherein the postal item is assigned to the advance information, associated with the reference number, and
   wherein, if obtaining the identification key is not successful, the postal item's reference number is determined through determining at least one characteristic of the postal item, using the at least one characteristic to search the advance information for a matching characteristic, which is associated with a reference number, and assigning the reference number associated with the matching characteristic to the postal item;
   electronically transmitting current data characterizing the shipping sequence of the postal item with the postal item's reference number from each of said further distribution center and the destination center in the course of the distribution process to the original distribution center; and
   changing the data record associated with the respective reference number and stored in the computer at the postal item's original distribution center.

2. The method as claimed in claim 1, wherein the identification key contains the reference number.

3. The method as claimed in claim 1, wherein the identification key containing an identifier relates to the original distribution center.

4. The method as claimed in claim 1, wherein data from the distribution centers, additionally determined there and characterizing postal items, are being transmitted electronically under the associated reference number to the respective original distribution center.

5. The method as claimed in claim 1, wherein the advance information comprises at least the reference number and the identification keys of the postal items to be expected.

6. The method as claimed in claim 1, wherein the identification key is being applied to the postal items in encoded and unencoded form, the encoded identification key being read first and, if it cannot be deciphered, the unencoded identification key being read.

7. The method as claimed in claim 1, wherein the postal items are being provided with new valid identification keys if validity ranges of the identification keys are exceeded.

8. The method as claimed in claim 1, wherein a radio frequency identification mark is being applied to the postal item in order to identify the postal item.

9. The method according to claim 1, further comprising the step of allocating resource capacity at the further distribution centers and the destination distribution centers for handling the postal item based upon the received data record.

* * * * *